United States Patent [19]
Barker

[11] Patent Number: 5,481,359
[45] Date of Patent: Jan. 2, 1996

[54] MULTI-ETALON VISAR INTERFEROMETER HAVING AN INTERFEROMETER FRAME OF HIGH STIFFNESS WITH A LINEAR ELONGATED SLIDE BAR

[76] Inventor: Lynn M. Barker, 13229 Circulo Largo N.E., Albuquerque, N.M. 87112

[21] Appl. No.: 294,546

[22] Filed: Aug. 23, 1994

[51] Int. Cl.$^6$ ..................................... G01B 9/02
[52] U.S. Cl. .................. 356/352; 356/345; 356/28.5
[58] Field of Search .............................. 356/27, 28, 28.5, 356/345, 352

[56] References Cited

U.S. PATENT DOCUMENTS

| | | | |
|---|---|---|---|
| 4,320,578 | 3/1982 | Ernst | 356/373 |
| 4,884,697 | 12/1989 | Takacs et al. | 356/360 |
| 5,245,473 | 9/1993 | Stanton et al. | 359/577 |

OTHER PUBLICATIONS

L. C. Chhabildas and R. A. Graham, "Developments in Measurement Techniques for Shock–Loaded Solids," in Techniques and Theory of Stress Measurements for Shock Wave Applications, Edited by R. B. Stout, F. R. Norwood, and M. E. Fourney, American Society of Mechanical Engineers, AMD–vol. 83, pp. 1–18 (1988).

L. M. Barker, "Velocity Interferometry for Time–Resolved High–Velocity Measurements, " in Proceedings of SPIE 27th Annual International Technical Symposium and Instrument Display, San Diego, Calif. , Aug. 21–26, 1983.

L. M. Barker and R. E. Hollenbach, "Laser Interferometer for Measuring High Velocities of Any Reflecting Surface," Journal of Applied Physics, vol. 43, No. 11, pp. 4669–4675, Nov., 1972.

B. T. Amery, "Wide Range Velocity Interferometer," in Sixth Symposium on Detonation (Office of Naval Research, Dept. of the Navy, Arlington, Va., Aug. 24–27, 1976), pp. 673–681.

Willard F. Hemsing, "Velocity sensing Interferometer (VISAR) Modification," Review of Scientific Instruments, vol. 50, No. 1, pp. 73–78, 1979.

*Primary Examiner*—Vincent P. McGraw
*Assistant Examiner*—Robert Kim

[57] ABSTRACT

A multi-etalon VISAR interferometer with variable velocity-per-fringe constant, capable of measuring the velocity of a diffusely-reflecting surface, having design innovations which preserve the fringe alignment of the interferometer even when its velocity-per-fringe constant is changed or when it is exposed to environmental stress such as substantial temperature changes or being moved from one location to another. The interferometer stability is enhanced by using a very stiff interferometer frame, to which the alignment-sensitive components of the interferometer are attached. The movable interferometer components are attached to a relatively long slide bar which can be attached to the interferometer frame at various locations in a slide bar track in the interferometer frame. Delay leg spacers allow the slide bar, with its movable interferometer components, to be positioned easily and accurately when changing the velocity-per-fringe constant.

18 Claims, 5 Drawing Sheets

MULTI-ETALON VISAR INTERFEROMETER HAVING AN INTERFEROMETER FRAME OF HIGH STIFFNESS WITH A LINEAR ELONGATED SLIDE BAR

BACKGROUND OF THE INVENTION

1. Field of the Invention

The present invention relates to laser velocity interferometry, specifically to an improved laser velocity interferometer for measuring large changes in velocity of any reflecting surface.

2. Discussion of Prior Art

Shock experiments involving projectile impacts or explosive detonations have been used for several decades to determine material properties under dynamic conditions and at extremely high pressures. A review of this field can be found in the paper by L. C. Chhabildas and R. A. Graham, "Developments in Measurement Techniques for Shock-Loaded Solids," in Techniques and Theory of Stress Measurements for Shock Wave Applications, Edited by R. B. Stout, F. R. Norwood, and M. E. Foumey, American Society of Mechanical Engineers, AMD—Vol. 83, pp 1–18 (1988).

One of the most valuable instrumentation techniques in shock experiments has been laser velocity interferometry, in which laser light is focused onto the specimen's surface. Some of the reflected light is collected, and, as the surface moves during a shock experiment, the Doppler shift of the reflected light is measured in an interferometer. The continuous measurement of the Doppler shift results in a continuous velocity history of the surface of the shocked specimen, from which, together with other information, the specimen material properties are calculated, as described in the above-mentioned paper by Chhabildas and Graham.

In addition to shock experiments, laser velocity interferometry has been widely applied to the measurement of the velocity histories of foil surfaces which are very rapidly accelerated by the sudden vaporization of a substrate layer, such as by electrical energy deposition or laser light energy deposition in the substrate material. Continuous velocity histories of projectiles as they accelerate through gun barrels have also been obtained through laser velocity interferometry.

A review of the field of laser velocity interferometry can be found in the paper by L. M. Barker, "Velocity Interferometry for Time-Resolved High-Velocity Measurements," which appears in Proceedings of SPIE 27th Annual International Technical Symposium and Instrument Display, San Diego, Calif. Aug. 21–26, 1983.

The most common form of laser velocity interferometer used for the above measurements has been the so-called Velocity Interferometer System for Any Reflector (VISAR), which was originally developed at Sandia National Laboratories by L. M. Barker and R. E. Hollenbach in the early 1970s. Our first technical paper on the VISAR was L. M. Barker and R. E. Hollenbach, "Laser Interferometer for Measuring High Velocities of Any Reflecting Surface," Journal of Applied Physics, Vol. 43, No. 11, pp 4669–4675, November 1972. In the following, the term VISAR will include the laser velocity interferometer which produces good fringe contrast even when illuminated by light from a diffusely reflecting surface, plus any optical elements necessary to make the input signal light into a beam suitable to traverse the optics of the interferometer, any optics both within and outside of the interferometer which are necessary for producing fringes in quadrature, any optics which are involved in producing the required delay time in one of the light paths of the interferometer, any optics to direct the output signal light to light detectors, and any incidental optical elements to direct, shape, filter, or adjust the intensity of the light beams which traverse the aforementioned components. Any optical mounts, frames, adjusting devices, etc., associated with the aforementioned components are also considered to be included in the term VISAR.

The VISAR works by using a beamsplitter to split the incident light beam, which is composed of light reflected from a specimen surface, into the two light paths (legs) of an interferometer. At the end of each leg is a mirror or retroreflector, which reflects the light back toward a recombining beamsplitter, usually a different point on the same beamsplitter that originally split the incident light beam into the two legs of the interferometer. In the following, the interferometer leg length will mean simply the distance from the beamsplitter surface (assuming the same beamsplitter both splits and recombines the beams) to the mirror or retroreflector of the interferometer leg in question.

The legs of the interferometer have unequal light travel times before the two split-off light beams are recombined, but in spite of the different travel times, they meet the criteria for forming high-contrast fringe patterns even when the interferometer is illuminated by light from a diffusely reflecting surface. In meeting these high-contrast fringe criteria, the original VISAR made use of one or more precision glass plates, called delay etalons, in one of the legs (the delay leg) of the interferometer, as explained in the above paper by Barker and Hollenbach. The time difference between the light travel times in the two legs of the VISAR interferometer is called the VISAR's delay time. It is proportional to the total glass thickness traversed by the light beam in the delay leg of the interferometer, assuming there is no glass in the other leg (the reference leg). If both legs of the interferometer contain glass through which the light must pass, the delay time is proportional to the excess thickness of glass through which light must travel in the delay leg.

The time delay arises from two sources: (1) Light travels slower in the glass, and (2) the delay leg with the excess glass must be physically lengthened in proportion to the amount of excess glass in order to meet the criteria for obtaining good fringe contrast. The precise distance by which the delay leg must be lengthened because of the addition of a given delay etalon is called the etalon's incremental delay leg length. Likewise, the precise time by which the VISAR's delay time is lengthened because of the addition of a given delay etalon is called the etalon's delay time.

The optical components of the interferometer which are physically moved in order to change the delay leg length are called the movable optical components of the interferometer. Similarly, those components which do not move enough to significantly affect the delay leg length are called the fixed optical components of the interferometer.

The specimen velocity change which would result in a fringe shift of one fringe in the VISAR interferometer is called the VISAR's Velocity-Per-Fringe (VPF) constant. The VPF constant is inversely proportional to the VISAR's delay time, and is a measure of the sensitivity of the VISAR. VISARs are usually made to allow for changing the sensitivity by adding or subtracting delay etalons in the delay leg of the VISAR. We shall refer to such VISARs as multi-etalon VISARs. The sensitivity (the VPF) of a multi-etalon VISAR can be changed to best fit the needs of a particular experiment.

When a VISAR interferometer is properly aligned, the output signal beams will normally illuminate only the central "bull's eye" of the interferometer's fringe pattern. Thus, only a small part of a fringe will be visible at any one time, and a fringe shift of one fringe will appear as one complete cycling of the light intensity.

The light fringes produced by a VISAR in a velocity measurement are normally recorded using photodetectors, such as photomultipliers, to transduce the fringe light intensity variations into voltage variations. Digitizing oscilloscopes may be used to record the voltage variations as a function of time. The voltage-time data points collected by the digitizing oscilloscopes can then be analyzed in a data reduction computer program to obtain the velocity vs. time which the specimen surface experienced during the experiment. Streak cameras have also been used to record the VISAR fringe shifts during an experiment.

VISARs also normally use polarization coding to obtain two sets of fringes approximately 90° out-of-phase with each other. This greatly enhances the accuracy of the data, allowing the fringe count to be determined at any time to about plus or minus 2% of one fringe, such that a data record containing four fringes can be expected to be accurate to within ½% of the peak velocity. The polarization coding also allows one to distinguish acceleration from deceleration.

The original multi-etalon VISARs had these attributes:

(1) Variable sensitivity to fit the experiment, by varying the delay time, (2) The ability to measure any surface, whether specular or diffusely reflecting, (3) Polarization coding for accuracy and for distinguishing acceleration from deceleration, (4) Fringes in proportion to velocity, not displacement, greatly decreasing the frequency response required to acquire the data, as well as decreasing the complexity of the data reduction, (5) Nanosecond time resolution, (6) Better than 1% accuracy in most experiments, and (7) Absence of any perturbation (by the instrumentation) of the velocity being measured.

A 1976 paper by B. T. Amery, "Wide Range Velocity Interferometer," in Sixth Symposium on Detonation (Office of Naval Research, Dept. of the Navy, Arlington Va., Aug. 24–27, 1976), pp. 673–681, called attention to the fact that the delay etalons in a VISAR interferometer can be replaced by two lenses which are separated by the sum of their focal lengths, thus achieving the required delay while retaining the diffuse specimen surface capability. A much wider range of delay times is available with the lens-generated delay leg, which allows for the accurate measurement of much smaller velocities when long delay times are selected. The intrinsic rise-time of the VISAR is not considered to be less than the delay time, however, so the advantage of finer velocity resolution carries the penalty of a slower rise-time. The present invention relates to multi-etalon VISARs, rather than Amery's lens delay leg VISARs.

A very significant improvement to the multi-etalon VISAR was made by Hemsing in 1978, and published in his paper Willard F. Hemsing, "Velocity Sensing Interferometer (VISAR) Modification," Review of Scientific Instruments, Vol. 50, No. 1, pp 73–78, 1979. The improvement cuts the amount of required laser light by at least 50% without any sacrifice in the signal-to-noise ratio of the instrument by making better use of the light emerging from the VISAR interferometer. In addition, stray non-laser light which may find its way into the signal light beam, such as self-light generated by the experiment, is largely self-cancelling. Hemsing's improvement retains all of the above listed attributes.

Because of the multi-etalon VISAR's impressive list of attributes, it has become widely recognized as the instrumentation technique of choice in certain applications requiring accurate measurement of large velocity changes.

Nevertheless, the use of multi-etalon VISAR instrumentation has been hampered by the very precise alignment requirements of the reflecting surfaces in the VISAR interferometer before its light fringes become visible. Even after visible fringes are obtained, previous multi-etalon VISAR embodiments often require frequent fringe optimization because of thermally or mechanically induced drift in the exact positions of the interferometer's reflecting components. Further, the fringe alignment is nearly always lost completely on changing delay etalons or on moving the VISAR from one location to another, for example. Once fringe alignment is lost, finding fringes again can be quite time consuming. Alignment difficulties can be very frustrating for the individuals setting up experiments, and they lead to inefficient use of time.

Another disadvantage of previous multi-etalon VISARs is their relatively large size and weight, which greatly limits their portability and requires large laboratory areas for their use.

The size, weight, and alignment problems are addressed in U.S. Pat. No. 5,245,473, granted to Philip L. Stanton, William C. Sweatt, O. B. Crump, Jr., and Lloyd L. Bonzon for "Apparatus and Method for Laser Velocity Interferometry." In their invention, the ability to change the sensitivity of the VISAR to fit the experiment is sacrificed in order to obtain the goals of small size and weight, plus fringe alignment stability. This is accomplished by permanently fixing a single delay etalon in the delay leg of the interferometer, and by cementing that etalon and all of the formerly movable interferometer components together in a pre-aligned configuration. This greatly simplifies the alignment problem, because fringe alignment is never lost; it only needs to be optimized slightly by piezoelectric means before a measurement.

Unfortunately, however, attribute No. 1 above, the ability to adjust the multi-etalon VISAR's sensitivity to fit the experiment, is lost in the single etalon "fixed cavity VISAR" of the Stanton, et. al., invention. Inasmuch as the entire interferometer, including a delay etalon, is permanently cemented together into one piece, it is impossible to change the delay, and thus the sensitivity, in the Stanton, et al. fixed cavity VISAR. The fixed cavity VISAR is therefore well suited to quality control types of measurements where nearly the same velocity range is experienced in every test, but it is not well suited for research experiments which involve very different velocity ranges.

OBJECTS OF THE INVENTION

Accordingly, several objects of the present invention are to provide a multi-etalon, i.e., adjustable-sensitivity VISAR interferometer and accessories in which:

1. The fringe alignment of the interferometer is preserved, even in the presence of normally misaligning events such as changing of its installed delay etalons or moving of the VISAR from one location to another.

2. The instrument's size and weight are much smaller than previous multi-etalon VISARs.

3. The sensitivity (i.e., the delay time) is much more easily changeable than in previous multi-etalon VISARs.

4. The thermal and mechanical stability of the instrument are increased, minimizing the need for frequent optimization of the fringe alignment.

SUMMARY OF THE INVENTION

These and other objects and advantages are achieved in the improved laser velocity interferometer of this invention. The invention comprises a VISAR interferometer having design innovations which better stabilize the alignment between the interferometer's reflecting elements. Other innovations facilitate ease and accuracy in the changing of the delay leg length to accommodate different delay etalon combinations, while at the same time maintaining the alignment of the interferometer's reflecting elements. These and other innovations fulfill the objectives of this invention.

To stabilize the alignment between the interferometer's reflecting elements, and to achieve small size and weight, a relatively small but very stiff interferometer frame element is used, to which the interferometer's reflecting elements are attached. VISAR components which do not comprise interferometer reflecting elements may also be attached to or rested upon the interferometer frame, or they may be attached to some other surface, such as a relatively thin base-plate to which the interferometer frame may also be attached.

To facilitate ease and accuracy in the changing of the delay leg length, the interferometer reflector which moves relative to the other interferometer reflecting elements is mounted to a linear elongated slide bar. The slide bar, in turn, is attachable to the interferometer frame in a linear elongated slide bar track means. The slide bar and slide bar track means must be of sufficient length, stiffness, and precision to allow the slide bar to be moved to different delay leg lengths in the slide bar track without losing the fringe alignment of the interferometer. In addition, delay leg spacers are provided which automatically position the slide bar and its attached components at the optimum delay leg lengths for various combinations of installed delay etalons. The use of delay leg spacers provides the needed ease and accuracy of changing delay leg lengths, while the length, stiffness, and precision of the slide bar and the slide bar track retain the fringe alignment of the interferometer.

To provide insensitivity of the fringe alignment to changes in ambient or local temperatures, while at the same time maintaining stiffness and light weight, the interferometer frame should be made of a strong, light-weight material with high thermal conductivity for equalizing any temperature variations within the frame. The slide bar should be made of the same material for similar reasons and so that thermal expansions and contractions in the frame and the slide bar will match. Further, the slide bar track should comprise a cavity in the interferometer frame, such that the temperature environment of the slide bar is the temperature of the interferometer frame. Alternatively, the slide bar can be surrounded on three sides by the interferometer frame, and on the fourth by the base plate to which the interferometer frame is attached. If the interferometer frame, the slide bar, and the base plate are all made of the same high thermal conductivity material, this shields the slide bar from temperature gradients which might lead to misalignment of the reflective element attached to it. The small size of the interferometer also contributes to its thermal stability.

The features and advantages of the present invention will become more apparent from the following detailed description of the invention when read with the accompanying drawings.

DESCRIPTION OF THE DRAWINGS

The accompanying drawings are only for the purpose of illustrating a preferred embodiment of the present invention, and are not to be construed as limiting the invention.

Figure 1:
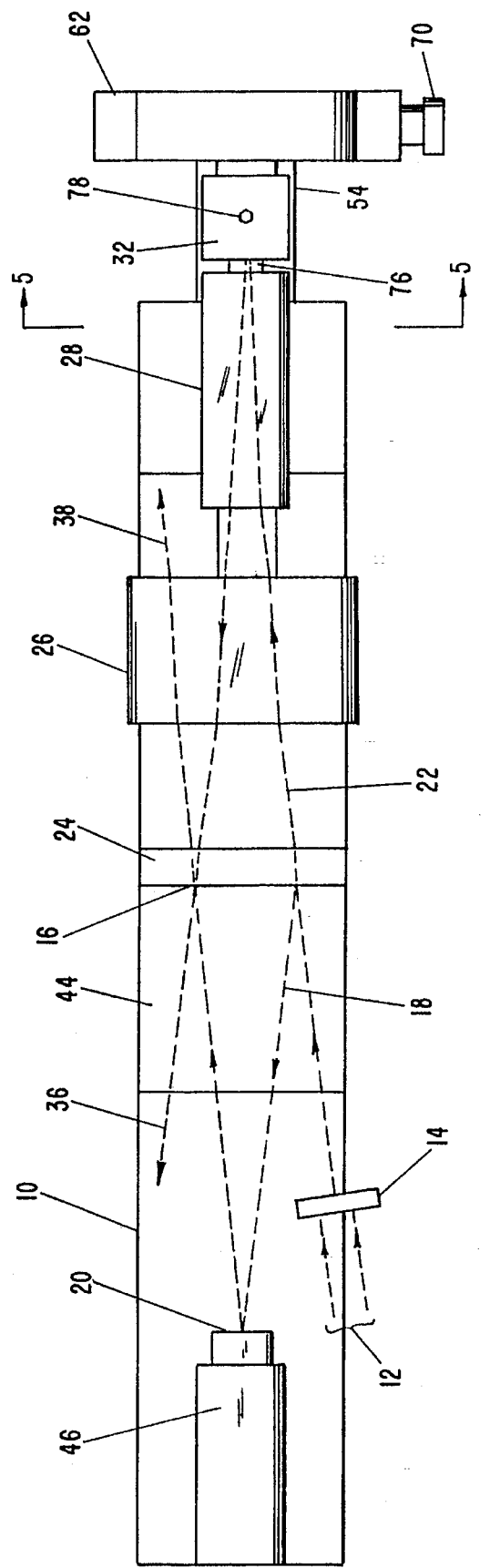
FIG. 1 is a schematic showing the light paths through the VISAR interferometer and some of the interferometer's components.

| LIST OF REFERENCE NUMERALS | | |
|---|---|---|
| No. | FIG. No. | Description |
| 10 | 1,2,4,5 | Interferometer frame |
| 12 | 1 | Interferometer input light beam |
| 14 | 1 | Adjustable diameter iris diaphragm |
| 16 | 1,2 | Large beamsplitter |
| 18 | 1 | Reference leg light beam |
| 20 | 1,2 | Reference leg interferometer mirror |
| 22 | 1 | Delay leg light beam |
| 24 | 1 | Glass of large beamsplitter |
| 26 | 1,2 | Large-diameter delay etalon |
| 28 | 1,2,4,5 | Small-diameter delay etalon |
| 30 | 4 | One-eighth wave retardation plate |
| 32 | 1,4 | Retardation plate holder |
| 34 | 3,4 | Delay leg interferometer mirror |
| 36 | 1 | Left-going exit light beam |
| 38 | 1 | Right-going exit light beam |
| 40 | 2,5 | Slide bar slot |
| 42 | 2,4,5 | Base plate |
| 44 | 1,2 | Large beamsplitter mount |
| 46 | 1,2 | Piezoelectric micropositioner |
| 48 | 2 | Piezoelectric micropositioner V-groove |
| 50 | 2,4,5 | Attachment screw slot |
| 52 | 3,4,5 | Attachment screw |
| 54 | 1,3,4,5 | Slide bar |
| 56 | 2 | Large diameter etalon trough |
| 58 | 2,5 | Small diameter etalon trough |
| 60 | 3,4 | Mirror mount shelf |
| 62 | 1,3,4 | Mirror mount |
| 64 | 3,5 | Slide bar indexing pads |
| 68 | 3,4 | Delay leg interferometer mirror holder |
| 70 | 1,3,4 | Precision tip and tilt control knobs |
| 72 | 3,4,5 | Delay leg spacer trough |
| 74 | 3,4 | Slide bar stopping surface |
| 76 | 1,4 | Delay leg spacers |
| 78 | 1,4 | Set screw |
| 80 | 4 | Interferometer frame stopping surface |
| 82 | 4 | Zero spacer |

DETAILED DESCRIPTION OF THE INVENTION

FIG. 1 shows a plan view of a preferred embodiment of the present invention in which the light paths are shown as dashed lines. The reflective elements of the interferometer are attached to an interferometer frame 10 of very high stiffness. The input light beam 12 can be attenuated by an adjustable iris diaphragm 14. Subsequently, the input light beam is incident onto a large beamsplitter 16 where it is split into two approximately equal beams. The split-off beam 18 traverses the reference leg of the interferometer, in which it is reflected from the reference leg mirror 20 and returned to a different part of the large beamsplitter 16. The other beam 22 traverses the delay leg of the interferometer, passing first through the glass of the large beamsplitter 24, then any installed delay etalons 26 and 28, then the one-eighth wave retardation plate 30 (held in place by its holder 32), and finally striking the delay leg mirror 34 (shown in FIG. 4). The mirror 34 reflects the beam back through the one-eighth wave retardation plate 30, the installed delay etalons 28 and 26, and the glass of the large beamsplitter 24, finally striking the large beamsplitter 16 at precisely the same place as the beam 18 which traversed the reference leg of the interferometer. Approximately half of the light from each leg of the interferometer then exits to the left 36, forming interference fringes, and approximately half of the light from each leg exits to the right 38, also forming interference fringes. A more complete description of the above components and other components identified in FIG. 1 will be given in the descriptions of subsequent figures.

Figure 2:
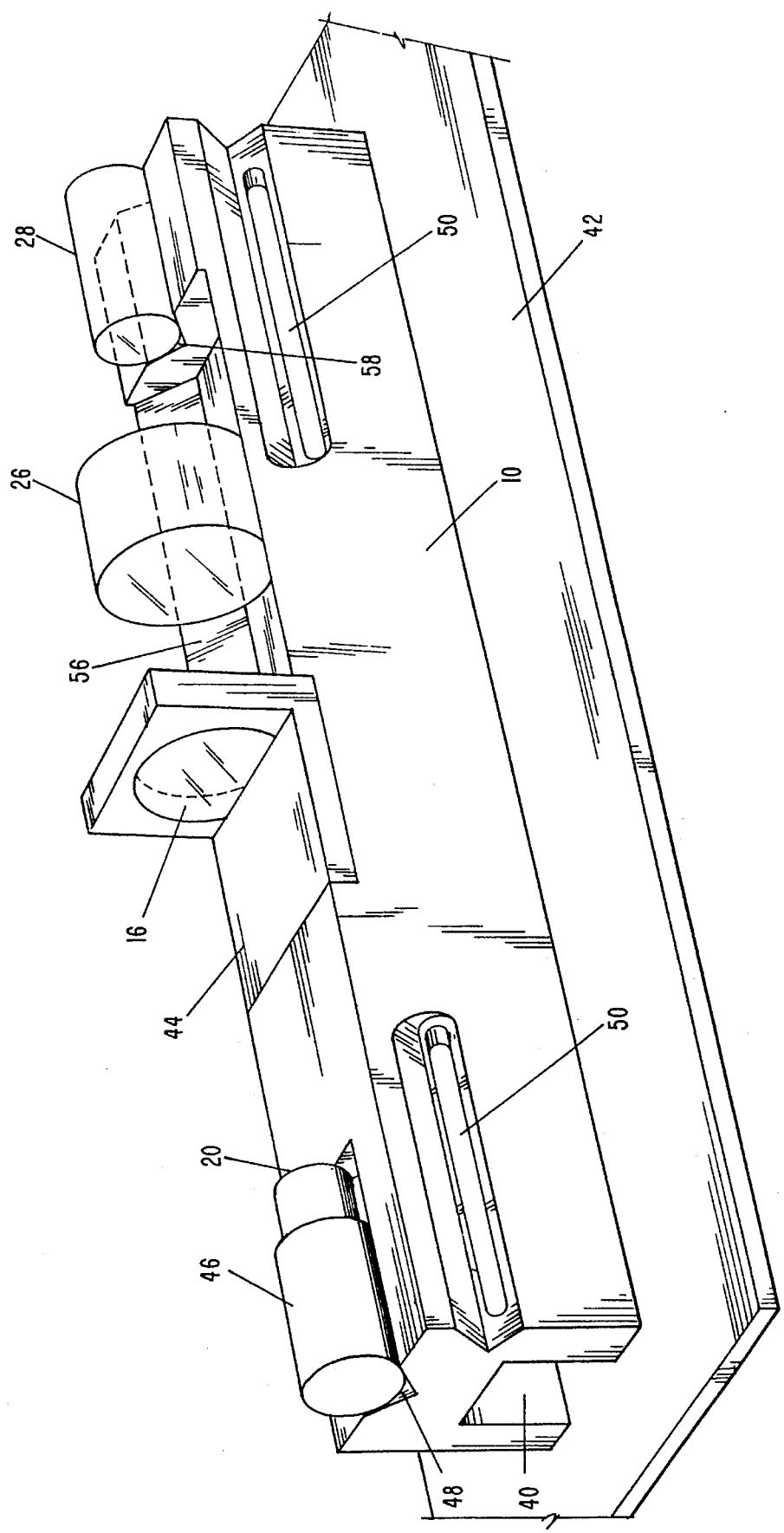
FIG. 2 shows the interferometer frame and some components which are permanently attached thereto. Also shown are a large diameter etalon and a small diameter etalon resting in their respective etalon troughs.
Figure 3:
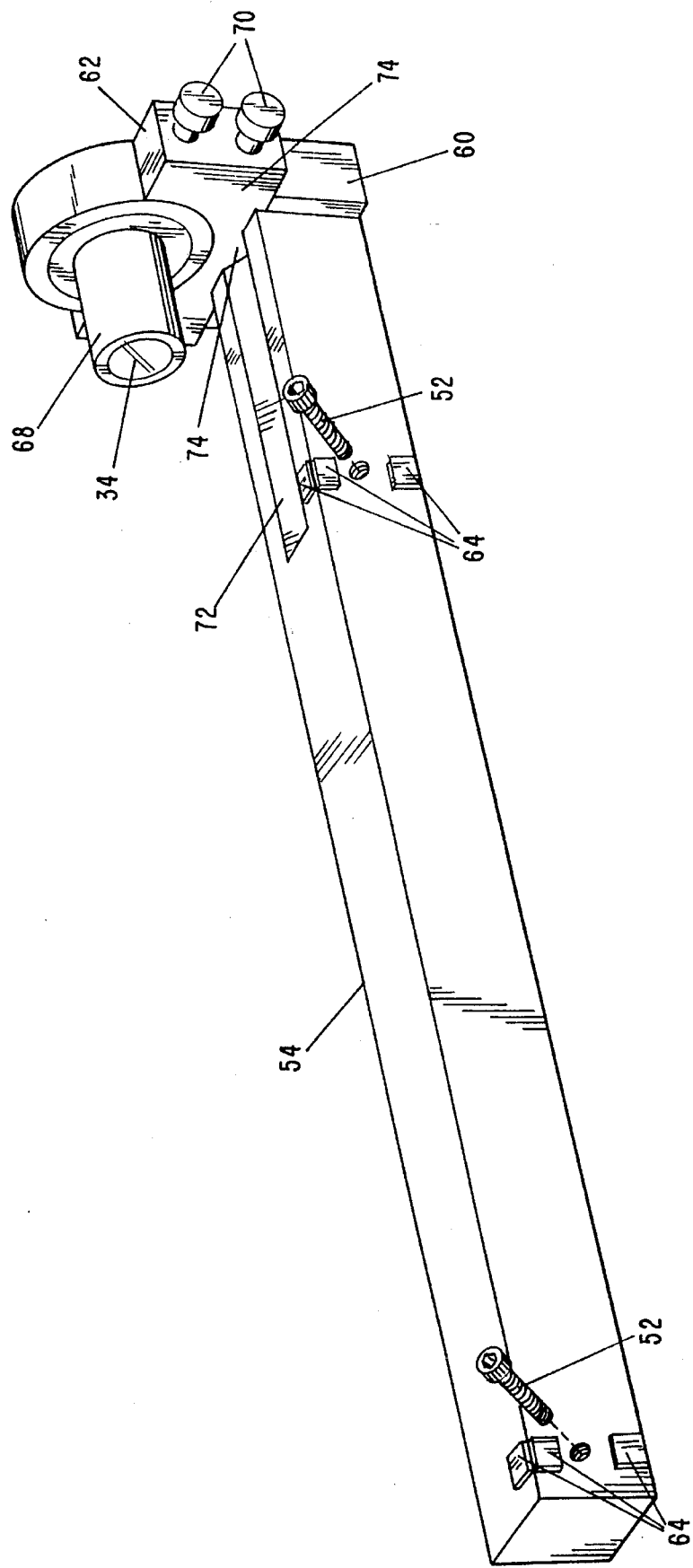
FIG. 3 shows the interferometer slide bar and some components which are permanently attached thereto.

FIG. 2 shows more details of the interferometer frame 10. It is machined from an aluminum alloy bar, and has outside dimensions of 70 mm high by 76 mm wide by 460 mm long. The frame 10 has a large slide bar slot 40 which runs the length of the under side of the frame, and which has a cross-section of 38×38 mm. The frame is attached by screws to an aluminum alloy base plate 42 which is approximately 6 mm thick, and sufficiently large to accommodate the mounting of accessory VISAR components. The large beamsplitter 16 is held in a beamsplitter mount 44, which is in turn attached by one or more screws from the under side to the interferometer frame 10. The beamsplitter mount 44 is made from the same material as the interferometer frame to assure matching thermally-induced changes in dimensions. The distance from the large beamsplitter 16 to the reference leg interferometer mirror 20 is approximately 170 mm. The reference leg interferometer mirror 20 is attached to a piezoelectric device 46 for micropositioning of the interferometer mirror 20, and the piezoelectric device 46 is attached in the piezoelectric device alignment V-groove 48 to the interferometer frame 10. Also shown in FIG. 2 are attachment screw slots 50 through which attachment screws 52 attach the slide bar 54 to the interferometer frame 10. The attachment screws 52 and the slide bar 54 are best seen in FIG. 3. The attachment screw slots 50 are 95 mm long, and make an angle of 45° with the horizontal. A large diameter delay etalon trough 56 is machined into the top of the interferometer frame 10 on the delay leg side of the large beamsplitter 16. The trough 56 accommodates a total thickness of large diameter etalons of 130 mm, and its dimensions are selected to hold the large diameter etalons approximately centered vertically on the delay leg light paths. A small diameter delay etalon trough 58 in the shape of a V-groove is also cut into the top of the interferometer frame, starting at the end of the large diameter etalon trough 56 and running the rest of the length of the interferometer frame. Its dimensions are selected to hold the small diameter etalon approximately centered vertically on the delay leg light paths.

FIG. 3 shows the slide bar 54 and some of the components attached to it. Most of the length of the slide bar has a cross section measuring 37×37 mm, such that it fits into the slide bar slot 40 with ½ mm clearance all around. This portion of the slide bar is 460 mm long, the same length as the interferometer frame 10. A mirror mount shelf 60 is machined on the end of the slide bar 54, and screws through the bottom of the mirror mount shelf 60 securely attach the mirror mount 62 to the slide bar 54. Two attachment screws 52 thread into two holes in the slide bar 54, angled at 45°. One of the attachment screws is 15 mm from the left end of the slide bar in FIG. 3, and the second is 340 mm from the first. Three slide bar indexing pads 64 are attached to the slide bar at each of the two longitudinal positions of the attachment screws 52. Two of the pads 64 at each attachment screw location are positioned on the surface through which the attachment screw is threaded, over and under the attachment screw, while the third pad is on the top surface close to its attachment screw. Each slide bar pad is composed of an 8 mm long piece of 6 mm wide hard plastic self-adhering tape with a low coefficient of friction, such as Teflon. Teflon is a trademark of E. I. DuPont de Nemours & Co., Wilmington, Del. The tape thickness is 0.3 mm. The delay leg interferometer mirror 34 is mounted in a mirror holder 68, which is mounted in the mirror mount 62. The length of the holder 68 is approximately 50 mm. Precision tip and tilt controls 70 allow for angular adjustment of the mirror 34 about two orthogonal axes, both of which are perpendicular to the longitudinal axis of the slide bar. A longitudinal V-shaped spacer trough 72 is machined into the top of the slide bar at its mirror mount end. The trough is 13 mm wide at the top, and is at least 100 mm long. The lower front surface 74 of the mirror mount 62 serves as the slide bar stopping surface when delay leg spacers 76 (FIG. 4) are used to fix the position of the delay leg interferometer mirror 34.

Figure 4:
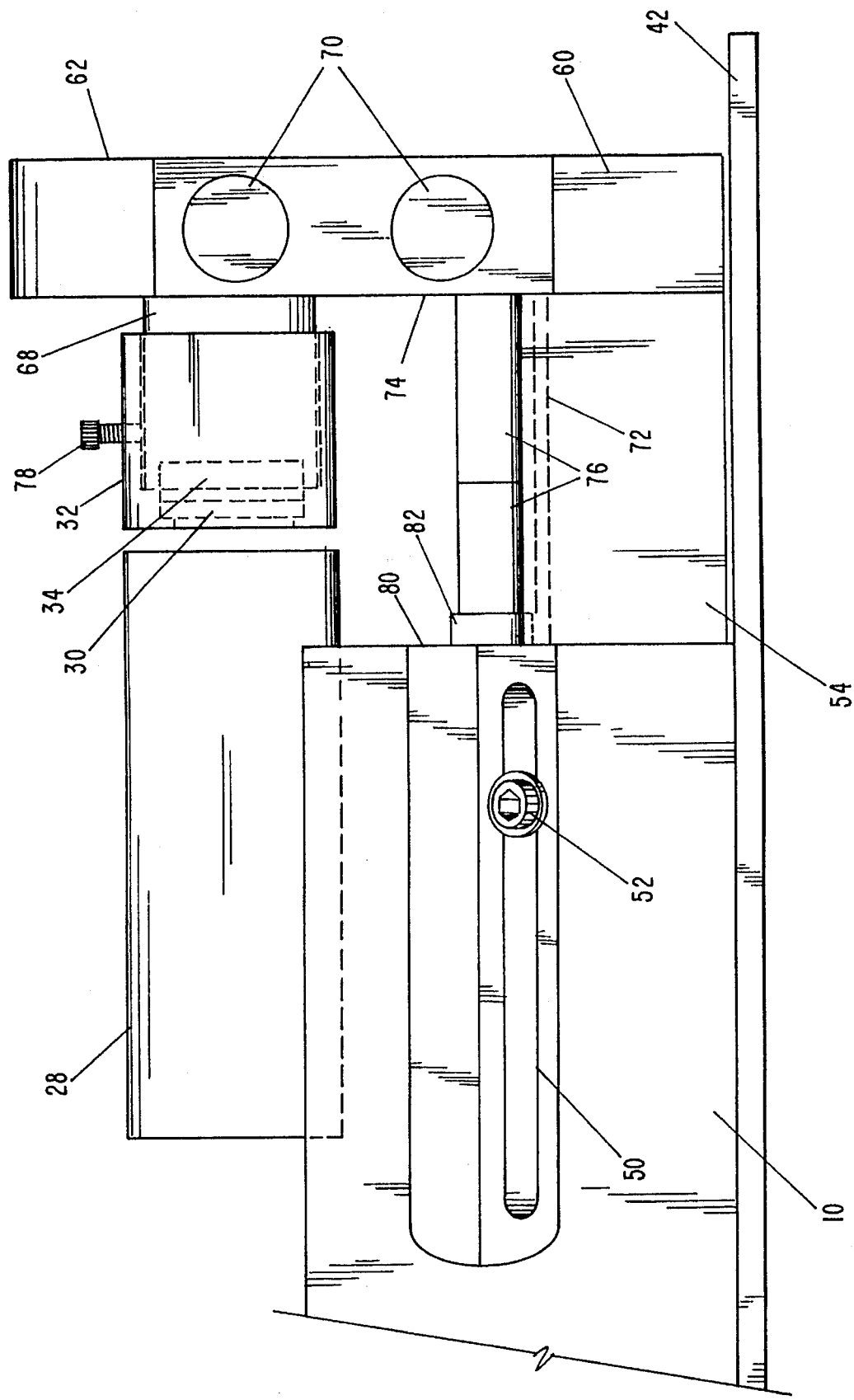
FIG. 4 is a close-up view of some components near the end of the delay leg of the interferometer, including the delay leg spacers.

FIG. 4 shows the delay leg ends of the interferometer frame 10 and the slide bar 54, plus a number of other components. A small diameter delay etalon 28 is shown resting in its trough 58. The one-eighth wave retardation plate 30 is shown as dashed lines inside its holder 32. The eighth-wave plate holder 32 fits over the mirror holder 68. The set screw 78 allows the eighth-wave plate 30 to be rotated about its longitudinal axis and then secured to the mirror holder 68 at the optimum orientation for polarization coding (90° out-of-phase fringe sets) purposes. The delay leg interferometer mirror 34 is shown by dashed lines inside the eighth-wave plate holder 32, and in a recess in the end of the mirror holder 68. Also shown in FIG. 4 are an attachment screw slot 50, an attachment screw 52, the base plate 42, the mirror mount 62, the precision tip and tilt adjusting knobs 70 for the delay leg interferometer mirror 34, and the mirror mount shelf 60. Finally and most importantly, the components relating to ease and accuracy in attaining the correct position of the delay leg interferometer mirror are shown: No. 80 is the interferometer frame stopping surface for the delay leg spacers 76, No. 74 is the slide bar stopping surface for the delay leg spacers 76, and 82 is the zero spacer which provides the correct slide bar position when no delay etalons are installed in the etalon troughs 56 and 58. The zero spacer 82 is attached by a screw to the interferometer frame stopping surface 80. The delay leg spacers are laid end-to-end in the spacer trough 72, and are held in place by gravity.

Figure 5:
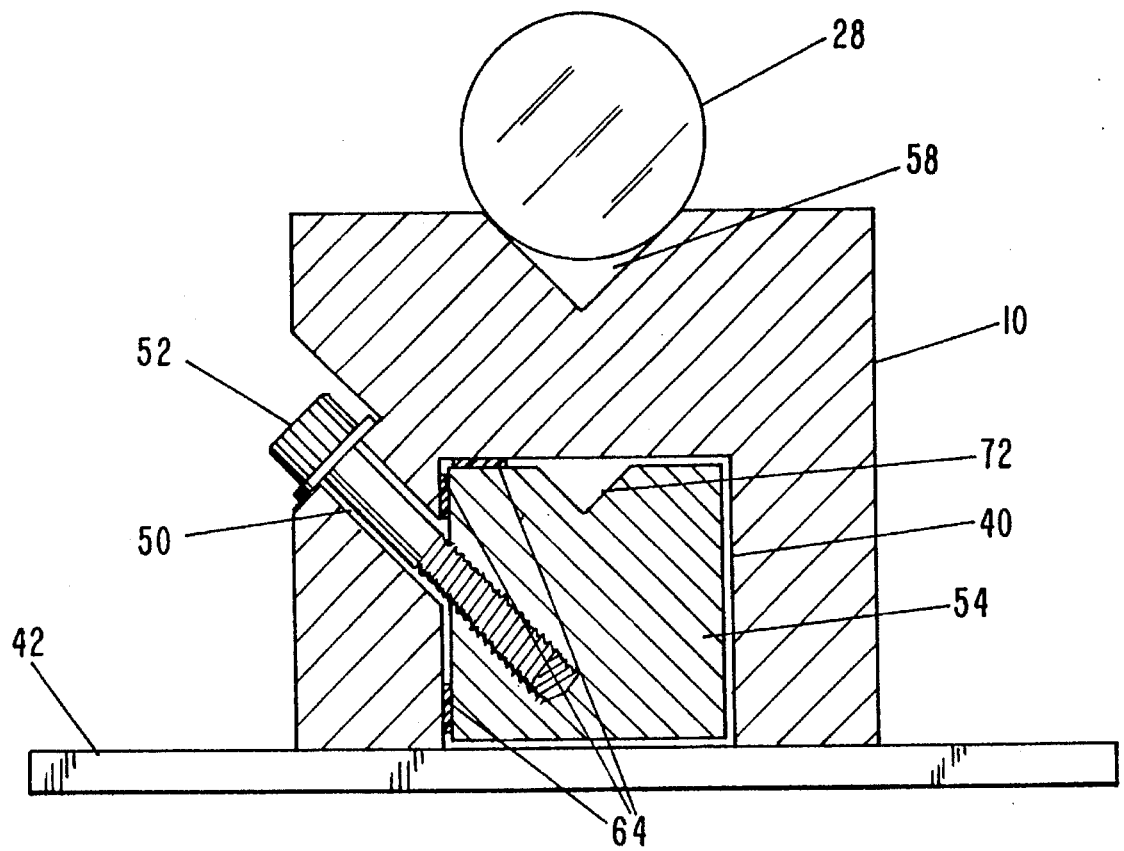
FIG. 5 is a cross-section view showing the method of attaching the slide bar to the interferometer frame.

FIG. 5 shows Section 5—5 from FIG. 1, which illustrates how the slide bar is attached to the interferometer frame. The components shown in FIG. 5 have all been identified in the previous drawings.

OPERATION OF THE INVENTION

The operational steps in using the improved VISAR interferometer to measure the velocity vs. time of a specimen surface are:

1. Prior to the measurement, the operator estimates the peak velocity expected in the measurement. Then, from a list of the VISAR's available Velocity-Per-Fringe (VPF) constants, the operator selects the VPF which will best serve the measurement. In many cases, the best choice of VPF will be ⅓ to ¼ of the peak expected velocity, so that about three or four fringes will be produced in the measurement.

2. The operator changes the VISAR's VPF from its pre-existing value to the desired (new) value as follows:

(a) Attachment screws 52 are loosened, and the slide bar 54 is moved as far out of the interferometer frame 10 as allowed by attachment screw slots 50.

(b) Any installed delay etalons, such as 26, 28, in the VISAR interferometer are removed to an etalon storage location. Likewise, any installed delay leg spacers 76 are removed to a spacer storage location.

(c) The new combination of delay etalons which will produce the desired VPF are taken from the etalon storage and installed in the delay leg of the VISAR interferometer by placing them in large diameter etalon trough 56 and/or small diameter etalon trough 58.

(d) The delay leg spacers 76 corresponding to the new combination of delay etalons are taken from the spacer storage and installed by placing them in delay leg spacer trough 72.

(e) Slide bar 54 is pushed into interferometer frame 10 until stopped by spacers 72. While holding the slide bar firmly against the spacers, the operator tightens attachment screws 52. The spacers cause the delay leg length to be optimum for best fringe visibility.

3. Light from a single-frequency laser is concentrated on the specimen surface, preferably at near-normal incidence.

4. Some of the light which is reflected in directions close to the normal to the specimen surface is collected and sent in a collimated beam into the improved VISAR interferometer.

5. Interference fringes will already be visible, thanks to the innovations of this invention. The fringe alignment may be optimized by the operator.

6. After appropriate electronic adjustments, the test is done causing the specimen surface to move. The Doppler-shifted light from the moving surface produces fringes in the VISAR interferometer. The fringes are sensed by photodetectors, and the photodetector outputs are recorded on digitizing oscilloscopes for subsequent analysis. The analysis consists of determining the number of fringes produced (the fringe count) since the surface velocity was zero, accurate to about 0.02 fringe or better, at each digitized time (such as once per nanosecond). The velocity at each time is obtained by multiplying the fringe count by the VPF used in the VISAR interferometer.

The VISAR components which require extremely precise alignment relative to each other consist only of the optically reflective elements of the interferometer itself, usually comprising one or more beamsplitters and two or more other reflective elements, such as mirrors or corner cube prism retroreflectors. The alignment tolerances Of other VISAR optical accessories are orders of magnitude less critical than those of the reflective elements in the interferometer. These other VISAR optical accessories may comprise elements which are outside the interferometer, such as mirrors, polarizing beamsplitters, lenses, filters, light attenuators, and light beam apertures. They may also comprise even delay etalons and optical retardation elements which are in the VISAR interferometer but which are not reflective elements. One of the innovations of the present invention is to concentrate much of the weight of the VISAR into very stiff structures which hold the intefferometer's reflective elements in very precise positions with respect to each other, thus assuring good stability of the interferometer's alignment. The other VISAR components can then be mounted on much lighter and consequently less-stable structures if necessary, without any degradation in the VISAR's performance.

When the VISAR interferometer's reflective elements can be permanently fixed with respect to each other, as in the case of always using the same delay etalon, only one very stiff structure is required with no moving parts, namely, a frame to which the interferometer's reflective elements are all permanently attached. This is the substance of the Stanton, et al., fixed cavity VISAR. However, this strategy eliminates the ability to change the delay leg length, and thus limits the VISAR to a single Velocity Per Fringe (VPF) constant, rather than allowing the user to select one of a number of possible VPFs to best meet the needs of a particular experiment. For a VISAR to have the capability of a number of different VPFs, it must be designed to have a changeable delay time, i.e., different delay etalons or combinations of delay etalons must be allowed in the interferometer. However, each delay etalon added to the interferometer requires a macroscopic change in the location of one of the reflective elements of the interferometer, usually the delay leg interferometer minor. Another innovation of the present invention is the use of a design which allows one of the VISAR interferometer's reflective elements to be moved to a different location to accommodate a different delay etalon combination without losing the interferometer's fringe alignment.

In the preferred embodiment of the invention shown in the figures, the interferometer frame 10 comprises one of the very stiff structures mentioned above. Its stiffness results from being machined from an aluminum alloy bar having substantial lateral-to-longitudinal dimension ratios. Because of aluminum's high thermal conductivity, temperature variations within the bar equalize quickly, thus assuring good thermal stability of the frame. The frame is attached to a base-plate 42, also preferably made of the same aluminum alloy for matching thermal expansion properties. The slide bar slot 40 and the base plate 42 form a cavity in which the slide bar resides. The slide bar should likewise be made of the same aluminum alloy for thermal expansion matching purposes. Having the slide bar enclosed in the cavity of high-thermal-conductivity material assures that the slide bar will experience only temperatures which are essentially the same as those of the interferometer frame and the base plate, leading to temperature insensitivity of the interferometer's alignment.

The slide bar is movable in the slide bar slot of the interferometer frame by a distance equal to the length of the attachment screw slots 17. This allows the distance from the delay leg interferometer mirror 34 to the large beamsplitter 16 to be varied according to the delay leg length required for the fringes to be visible, depending on the delay etalons installed in the delay leg. After the slide bar is placed at the proper delay leg length, it is attached to the interferometer frame by tightening the two attachment screws 52. Contact between the slide bar and the interferometer frame is made only at six slide bar indexing pads 64, three of which are close to each of the attachment screws, as shown in FIG. 3.

The use of the slide bar indexing pads creates a three-point indexing of the slide bar at each attachment screw, because the 45° angle of each screw pulls the slide bar to the position where all three of its indexing pads are in simultaneous contact with the slide bar slot surfaces at the same time (FIG. 5). Therefore, as long as the portions of the slide bar slot surfaces contacted by the slide bar indexing pads are straight, i.e., are all contained in two perpendicular planes, the slide bar can be moved from one delay leg length position to another without any appreciable angular misalignment of the longitudinal axis of the slide bar, and hence of the delay leg interferometer reflector. The relatively large longitudinal distance between the two attachment screws also contributes to the angular stability of the delay leg interferometer mirror 34, and to the repeatability of its angular position after moving from one delay leg length position to another. The placement of the slide bar indexing pads at the same longitudinal positions as the attachment screws 52 prevents any torque from developing to longitudinally bend the slide bar when the attachment screws are tightened. It can be easily appreciated that the indexing pads serve to relax the straightness tolerances on the slide bar and those portions of the slide bar slot which are never contacted by the indexing pads. In other embodiments of the invention, the slide bar indexing pads may be made of different materials or of different dimensions, they may be machined as an integral part of the slide bar, or they may be omitted altogether.

Each combination of installed delay etalons in a VISAR requires a unique distance relationship between the reflective elements of the interferometer. In the preferred embodiment, the required distance relationships are achieved by moving the delay leg interferometer mirror either toward or away from the large beamsplitter by the use of the slide bar described above. It happens that the distance by which the delay leg interferometer mirror must be increased (backed off) for a given delay etalon is a constant associated with that etalon, i.e., whenever a delay etalon is inserted into the delay leg of the interferometer, the delay leg interferometer mirror must be backed off by that delay etalon's incremental delay leg length in order for visible fringes to be obtained. Conversely, whenever a delay etalon is removed from the interferometer's delay leg, the delay leg interferometer mirror must be moved forward by that etalon's incremental delay leg length. In previous VISAIt embodiments, the total incremental delay leg length for a particular combination of installed etalons was calculated and added to the zero-etalon delay leg length, and the delay leg interferometer mirror was then manually positioned at the total delay leg length, usually using a micrometer. This was often followed by fine-tuning to the optimum delay leg length by trial and error, using delay leg lengths close to the calculated one.

A new innovation of the present invention enhances the ease and accuracy of achieving the optimum delay leg length. A delay leg spacer is made for each delay etalon which is available for use in the interferometer, and the length of each spacer is made exactly equal to the incremental delay leg length of its matching delay etalon. The exact spacer length is a function of its etalon's thickness and index of refraction, generally being roughly one-third of its matching etalon's thickness. In addition, a "zero spacer" is made to position the delay leg interferometer reflector to where fringes are optimized when no delay etalons are installed in the delay leg of the interferometer. The zero spacer 82 can be permanently attached to the interferometer frame stopping surface 80 where it will be in line with any other delay leg spacers in use at the time. The delay leg spacers 76 matching any installed delay etalons are laid end-to-end in the spacer trough 72, located in the top surface of the slide bar..

The procedure for changing the VISAR's Velocity-Per-Fringe constant thus involves the following steps:

(1) Loosen the two attachment screws 52 and move the slide bar 54 as far as it will go out of the interferometer frame 10.

(2) Remove any previously installed delay etalons which are no longer desired, and install any additional etalons desired in the delay leg of the interferometer. Etalons are installed simply by placing them into their appropriate delay etalon troughs 56 or 58. They are held in place only by gravity.

(3) Remove all delay leg spacers 76 from the spacer trough 72, and then install only those spacers which match the installed delay etalons. Delay leg spacers are installed simply by placing them end-to-end in the spacer trough 72.

(4) Push the slide bar back as far as it will go into the interferometer frame, and, while holding it against the spacer stops, tighten the two attachment screws 52 to regain fringe alignment.

This procedure can be easily carried out in less than a minute even by inexperienced personnel.

As in the Stanton, et al. patent, a piezoelectric device is included to translate the mirror 20 of FIG. 2 by a microscopic distance, thereby creating a flow of fringes which aids in optimizing the alignment of the interferometer. The incorporation of such piezoelectric devices for this purpose in VISARs has been common practice for many years. The microscopic distance moved by the mirror 20 as a result of voltage applied to its piezoelectric mount is far too small to be significant compared to the lengths of delay leg spacers, for example.

The above-described features of the present invention enhance the ease-of-use of the VISAR by always maintaining the fringe alignment of the VISAR interferometer, thus eliminating any lengthy searches for proper fringe alignment of the interferometer.

CONCLUSIONS, RAMIFICATIONS, AND SCOPE OF THE INVENTION

Thus the reader will see that the multi-etalon VISAR of the present invention provides for improved ease in changing the Velocity-Per-Fringe constant, prevents loss of fringe alignment even in the presence of normally misaligning events such as changing of its installed delay etalons or moving of the interferometer from one location to another, and allows construction of a VISAR with a much smaller final weight because mass is concentrated only where necessary for fringe stability. Because of these improvements, the set-up time for a VISAR measurement is decreased, the VISAR is more portable, it takes up less laboratory space, and it can be operated by less highly trained personnel.

While my above description contains many specificities, these should not be construed as limitations on the scope of the invention, but rather as an exemplification of one preferred embodiment thereof. Many other variations are possible. For example, the interferometer could comprise a glass cube beamsplitter with the beamsplitting surface on a diagonal of the cube, rather than the flat beamsplitter 16 shown in the drawings. The interferometer frame might then comprise an L-shaped structure, rather than the linear frame 10 of the preferred embodiment shown in the figures.

Retroreflecting corner cube prisms could be used instead of the two interferometer mirrors. In order to achieve the optimum delay leg length, delay leg spacers might be disposed between one end of the slide bar and a stop fixed to the base plate 42, for example, in which case spacers would be removed, rather than added, on installing etalons. Also, the slide bar might not be enclosed in a cavity bounded by the interferometer frame and the base plate. Accordingly, the scope of the invention should be determined not by the embodiment illustrated, but by the appended claims and their legal equivalents.

What is claimed is:

1. An improved multi-etalon VISAR interferometer, comprising traditional multi-etalon VISAR interferometer components, said traditional multi-etalon VISAR interferometer components comprising a first beamsplitter means, a second beamsplitter means, two separate interferometer light paths, multiple precision glass plates, said glass plates being referred to as delay etalons, and fixed optical components and movable optical components;

said first beamsplitter means acting to split an incident light beam to travel through said two separate interferometer light paths before being recombined by said second beamsplitter means to form interference fringes, said two separate interferometer light paths being referred to respectively as the reference leg and the delay leg, with the lengths of said two separate interferometer light paths being referred to respectively as the reference leg length and the delay leg length, said delay leg length being longer than said reference leg length for introducing a delay in the portion of said incident light beam which traverses said delay leg before recombination; said delay leg being designed to accept various combinations of said delay etalons disposed in said delay leg of said VISAR interferometer, said VISAR interferometer having the characteristic that best fringe resolution can be obtained only at a precise optimum delay leg length as compared to said reference leg length, said optimum delay leg length being dependent on the thicknesses and indices of refraction of those said delay etalons which comprise the particular combination of said delay etalons which are disposed in said delay leg; said movable optical components being those which are designed to move with respect to said fixed optical components in order to achieve said optimum delay leg length for any said particular combination of said delay etalons which are disposed in said delay leg; wherein the improvement in said improved multi-etalon VISAR interferometer comprises a fringe alignment preservation means comprising a. an interferometer frame of high stiffness, to which said fixed optical components of said VISAR interferometer are securely attached;

b. a linear elongated slide bar to which said movable optical components of said VISAR interferometer are securely attached;

c. a linear elongated slide bar track means integral with said interferometer frame, which guides said slide bar in its longitudinal direction for allowing changes to be made in said delay leg length of said VISAR interferometer, said slide bar and said slide bar track means together serving to preserve, to a high degree of precision, the angular orientation of said movable optical components when said slide bar is longitudinally moved in said slide bar track means to change said delay leg length; and d. attachment means for attaching said slide bar at various positions in said slide bar track means for allowing adjustment of said delay leg length, said interferometer frame, said slide bar, said slide bar track means, and said attachment means all being of such stiffness, design, and precision as to preserve said VISAR interferometer's fringe alignment to the extent that visible fringes are still present after said VISAR interferometer's delay leg length is changed from one said optimum delay leg length, corresponding to a certain combination of said delay etalons, to a new said optimum delay leg length, corresponding to a new combination of said delay etalons.

2. The invention of claim 1 wherein said slide bar has a rectangular cross-section; wherein said slide bar track means comprises a linear slide bar slot of rectangular cross-section and a high degree of straightness in said interferometer frame, said slide bar being movable in said slide bar slot; and wherein said attachment means seats said slide bar into a corner of said slide bar slot during attachment for precisely preserving the orientation of the longitudinal axis of said slide bar when said slide bar is moved from one position to another in said slide bar slot.

3. The invention of claim 2 wherein said attachment means comprise two attachment screws which are screwed into two longitudinally widely separated attachment screw holes in said slide bar, said attachment screw holes being oriented approximately perpendicular to the longitudinal axis of said slide bar, and said attachment screw holes also being oriented at approximately 45° with respect to the sides of said slide bar; said attachment means further comprising two attachment screw slots in a side of said interferometer frame, through which said attachment screws pass, thus allowing said slide bar to be simultaneously pulled into one corner of said slide bar slot and attached to said interferometer frame by the tightening of said attachment screws.

4. The invention of claim 3 further comprising slide bar indexing pads located on said slide bar near said attachment screw holes, said slide bar indexing pads serving as the only points of contact between said slide bar and the insides of said slide bar slot, thus relaxing straightness tolerances on said slide bar, as well as straightness tolerances on those portions of said slide bar slot which are never contacted by said indexing pads.

5. The invention of claim 1 further comprising multiple slide-bar precision stop means, each of said stop means serving, for a particular combination of said delay etalons disposed in said delay leg, to position said slide bar at said optimum delay leg length required for maximum fringe visibility, said stop means comprising a. an interferometer frame stopping surface which is fixed with respect to said interferometer frame;

b. a slide bar stopping surface which is fixed with respect to said slide bar;

c. delay leg spacers which can be disposed between said interferometer frame stopping surface and said slide bar stopping surface; and d. spacer holder means to hold said delay leg spacers end-to-end between said stopping surfaces.

6. The invention of claim 5 wherein said delay leg spacers have precision lengths which cause said slide bar to be positioned at said optimum delay leg length for a particular combination of said delay etalons disposed in said delay leg when a. a selection of delay leg spacers corresponding to said combination of said delay etalons is disposed in said spacer holder means, and when b. said slide bar is moved to its stop position where simultaneous linear contact is achieved between said stopping surfaces and all of said selection of delay leg spacers laid end-to-end in said spacer holder means.

7. The invention of claim 6 wherein the length of one of said delay leg spacers, called the zero spacer, achieves said optimum delay leg length for the case in which the combination of said delay etalons disposed in said delay leg consists of no delay etalons disposed in said delay leg, and wherein the remaining delay leg spacers are matched on an individual basis to the available delay etalons, each said delay leg spacer having its length equal to the incremental delay leg length change of its matching delay etalon, such that said optimum delay leg length for a particular combination of said delay etalons disposed in said delay leg can be achieved by disposing, in said spacer holder means, said zero spacer and the individual delay leg spacers which match each said delay etalon included in said particular combination of said delay etalons disposed in said delay leg.

8. The invention of claim 7 wherein said spacer holder means comprise a trough in the top of said slide bar in which said delay leg spacers can be laid end-to-end, and wherein said interferometer frame stopping surface and said slide bar stopping surface are so positioned as to encounter said delay leg spacers when said delay leg spacers are laid in said trough and said slide bar is pushed to its said stop position.

9. The invention of claim 8 wherein said zero spacer is permanently attached either to said interferometer frame stopping surface or to said slide bar stopping surface.

10. A new multi-etalon VISAR interferometer comprising traditional multi-etalon VISAR interferometer components, said traditional multi-etalon VISAR interferometer components comprising a first beamsplitter means, a second beamsplitter means, two separate interferometer light paths, multiple precision glass plates, said glass plates being referred to as delay etalons, and fixed optical components and movable optical components;

said first beamsplitter means acting to split an incident light beam to travel through said two separate interferometer light paths before being recombined by said second beamsplitter means to form interference fringes, said two separate interferometer light paths being referred to respectively as the reference leg and the delay leg, with the lengths of said two separate interferometer light paths being referred to respectively as the reference leg length and the delay leg length, said delay leg length being longer than said reference leg length for introducing a delay in the portion of said incident light beam which traverses said delay leg before recombination; said delay leg being designed to accept various combinations of said delay etalons disposed in said delay leg of said VISAR interferometer, said VISAR interferometer having the characteristic that best fringe resolution can be obtained only at a precise optimum delay leg length as compared to said reference leg length, said optimum delay leg length being dependent on the thicknesses and indices of refraction of those said delay etalons which comprise the particular combination of said delay etalons which are disposed in said delay leg; said movable optical components being those which are designed to move with respect to said fixed optical components in order to achieve various values of said delay leg length for allowing said optimum delay leg length to be achieved for any said particular combination of said delay etalons which are disposed in said delay leg; said new VISAR interferometer also comprising a fringe alignment preservation means which makes the fringe alignment of said VISAR interferometer much more stable than in previous multi-etalon VISARs, said fringe alignment preservation means comprising a. an interferometer frame of high stiffness, to which said fixed optical components of said VISAR interferometer are securely attached;

b. a linear elongated slide bar to which said movable optical components of said VISAR interferometer are securely attached;

c. a linear elongated slide bar track means integral with said interferometer frame, which guides said slide bar in its longitudinal direction for allowing changes to be made in said delay leg length of said VISAR interferometer, said slide bar and said slide bar track means together serving to preserve, to a high degree of precision, the angular orientation of said movable optical components when said slide bar is longitudinally moved in said slide bar track means to change said delay leg length; and d. attachment means for attaching said slide bar at various positions in said slide bar track means, thus allowing adjustment of said delay leg length, said interferometer frame, said slide bar, said slide bar track means, and said attachment means all being of such stiffness, design, precision, and thermal properties as to preserve said interferometer's fringe visibility during normal usage.

11. The invention of claim 10 wherein said slide bar has a rectangular cross-section; wherein said slide bar track means comprises a linear slide bar slot of rectangular cross-section and a high degree of straightness in said interferometer frame, said slide bar being movable in said slide bar slot; and wherein said attachment means seats said slide bar into a corner of said slide bar slot during attachment for achieving a precise preservation of the orientation of the longitudinal axis of said slide bar even when said slide bar is changed from one delay leg length position to another in said slide bar slot.

12. The invention of claim 11 wherein said attachment means comprise two attachment screws which are screwed into two longitudinally widely separated attachment screw holes in said slide bar, said attachment screw holes being oriented approximately perpendicular to the longitudinal axis of said slide bar, and said attachment screw holes also being oriented at approximately 45° with respect to the sides of said slide bar; said attachment means further comprising two attachment screw slots in a side of said interferometer frame, through which said attachment screws pass, thus allowing said slide bar to be simultaneously pulled into one corner of said slide bar slot and attached to said interferometer frame by the tightening of said attachment screws.

13. The invention of claim 12 further comprising slide bar indexing pads located on said slide bar near said attachment screw holes, said slide bar indexing pads serving as the only points of contact between said slide bar and the insides of said slide bar slot, thus relaxing straightness tolerances on said slide bar, as well as straightness tolerances on those portions of said slide bar slot which are never contacted by said indexing pads.

14. The invention of claim 10 further comprising multiple slide-bar precision stop means, each of said stop means serving, for a particular combination of said delay etalons disposed in said delay leg, to position said slide bar at said optimum delay leg length required for maximum fringe visibility, said stop means comprising a. an interferometer frame stopping surface which is fixed with respect to said interferometer frame;

b. a slide bar stopping surface which is fixed with respect to said slide bar;

c. delay leg spacers which can be disposed between said interferometer frame stopping surface and said slide bar stopping surface; and d. spacer holder means to hold said delay leg spacers end-to-end between said stopping surfaces.

15. The invention of claim 14 wherein said delay leg spacers have precision lengths which cause said slide bar to be positioned at said optimum delay leg length for a particular combination of said delay etalons disposed in said delay leg when a. a selection of delay leg spacers corresponding to said combination of said delay etalons is disposed in said spacer holder means, and when b. said slide bar is moved to its stop position where simultaneous linear contact is achieved between said stopping surfaces and all of said selection of delay leg spacers laid end-to-end in said spacer holder means.

16. The invention of claim 15 wherein the length of one of said delay leg spacers, called the zero spacer, achieves said optimum delay leg length for the case in which the combination of said delay etalons disposed in said delay leg consists of no delay etalons disposed in said delay leg, and wherein the remaining delay leg spacers are matched on an individual basis to the available delay etalons, each said delay leg spacer having its length equal to the incremental delay leg length change of its matching delay etalon, such that said optimum delay leg length for a particular combination of said delay etalons disposed in said delay leg can be achieved by disposing, in said spacer holder means, said zero spacer and the individual delay leg spacers which match each said delay etalon included in said particular combination of said delay etalons disposed in said delay leg.

17. The invention of claim 16 wherein said spacer holder means comprise a trough in the top of said slide bar in which said delay leg spacers can be laid end-to-end, and wherein said interferometer frame stopping surface and said slide bar stopping surface are so positioned as to encounter said delay leg spacers when said delay leg spacers are laid in said trough and said slide bar is pushed to its said stop position.

18. The invention of claim 17 wherein said zero spacer is permanently attached either to said interferometer frame stopping surface or to said slide bar stopping surface.

* * * * *